United States Patent
Bass et al.

(10) Patent No.: US 6,498,781 B1
(45) Date of Patent: Dec. 24, 2002

(54) SELF-TUNING LINK AGGREGATION SYSTEM

(75) Inventors: Brian Mitchell Bass, Apex, NC (US); Jean Louis Calvignac, Cary, NC (US); Marco C. Heddes, Raleigh, NC (US); Clark Debs Jeffries, Durham, NC (US); Loren Douglas Larsen, Durham, NC (US); Jeffrey James Lynch, Apex, NC (US); Mark Anthony Rinaldi, Durham, NC (US); Michael Steven Siegel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/374,003

(22) Filed: Aug. 13, 1999

(51) Int. Cl.[7] .............................. H04L 12/26
(52) U.S. Cl. .................... 370/230.1; 370/252
(58) Field of Search ................. 370/229, 230, 370/230.1, 231, 232, 233, 234, 235, 236, 252, 253, 395.21, 395.41, 395.42, 395.43

(56) References Cited

U.S. PATENT DOCUMENTS

| | | | |
|---|---|---|---|
| 4,383,316 A | 5/1983 | Seidel | 370/118 |
| 4,775,987 A | 10/1988 | Miller | 375/38 |
| 5,050,161 A | 9/1991 | Golestani | 370/60 |
| H1175 H | 4/1993 | Giorgio | 370/118 |
| 5,231,649 A | 7/1993 | Duncanson | 375/38 |
| 5,335,224 A | 8/1994 | Cole et al. | 370/84 |
| 5,400,324 A | 3/1995 | Eriksson et al. | 370/60 |
| 5,459,720 A | 10/1995 | Iliev et al. | 370/60 |
| 5,539,740 A | 7/1996 | Bruckner | 370/60.1 |
| 5,570,356 A | 10/1996 | Finney et al. | 370/85.9 |
| 5,617,417 A | 4/1997 | Sathe et al. | 370/394 |
| 5,675,576 A | * 10/1997 | Kalampoukas et al. | 370/232 |
| 5,748,901 A | 5/1998 | Afek et al. | 395/200.68 |
| 6,002,667 A | * 12/1999 | Manning et al. | 370/232 |
| 6,359,863 B1 | * 3/2002 | Varma et al. | 370/232 |

FOREIGN PATENT DOCUMENTS

| | | | |
|---|---|---|---|
| WO | 97/14240 | 4/1997 | H04L/12/56 |

OTHER PUBLICATIONS

"Dynamic Computation of TCP . . . " IBM Technical Disclosure Bulletin, vol. 37 No. 04A, Apr. 1994, pp. 601–607.

"On the Fly Bandwidth . . . " IBM Technical Disclosure Bulletin, vol. 40 No. 11, Nov. 1997, pp. 53–55.

"Using Data Link Control–Level" IBM Technical Disclosure Bulletin, vol. 41 No. 01, Jan. 1998, pp. 199–203.

(List continued on next page.)

*Primary Examiner*—Kwang Bin Yao
(74) *Attorney, Agent, or Firm*—Bracewell & Patterson, LLP; James E. Boice (57) ABSTRACT

A data processing system and method in a computer network are disclosed for improving performance of a link aggregation system included in the network. Parameters are established which are utilized to determine performance criteria of the link aggregation system. A performance of the link aggregation system is determined by determining the performance criteria. The performance of the link aggregation system changes in response to a flow traffic burden on the link aggregation system changing. The link aggregation system dynamically modifies the parameters in response to the changing performance of the link aggregation system. The link aggregation system is self-tuning and capable of automatically adjusting to a changing flow traffic burden on the link aggregation system.

16 Claims, 5 Drawing Sheets

OTHER PUBLICATIONS

U.S. Statutory Invention Registration: Giorgio, No. H1175, Apr. 6, 1993.

IBM Technical Disclosure Bulletin, V. 41, No. 01, 01/ 98 "Using Data Link Control–Level Feedback to Control Application Buffer Usage and Packed Loss" pp 199–203.

IBM Technical Disclosure Bulletin, V. 40, No. 11,11/98 "On the Fly Bandwidth Reservation Control" pp 53–55.

IBM Technical Disclosure Bulletin, V. 37, No. 04A, 04/94 "Dynamic Computation of TCP Maximum Window Size for Directly Connected Hosts" pp 601–607.

* cited by examiner

SELF-TUNING LINK AGGREGATION SYSTEM

BACKGROUND OF THE INVENTION

1. Field of the Invention

The present invention relates in general to data processing systems and, in particular, to a data processing system and method in a computer network for improving performance of a link aggregation system to minimize the number of flush operations. Still more particularly, the present invention relates to a self-tuning link aggregation system included within a computer network.

2. Description of the Related Art

In a networking environment, it is typical that a plurality of devices will be linked together for the purpose of transmitting data from one device to another in the network. In a large network, it would be uneconomical to provide a specific data link connecting each device to each of the other devices in the network. In order to provide connectivity from each device to each of the other devices in the network in an efficient and economical manner, a plurality of methods have been developed.

One well known method of distributing data between devices within a network is through switches. Switches may be utilized within the network to receive data from a plurality of devices and distribute the data to a plurality of devices to reduce the amount of data lines required to distribute data. To utilize switches to communicate between devices, each device has a specific address. Specifically in an Ethernet switching environment, each device in the network has a media access control (MAC) address, which uniquely identifies the device in the network. Frames of data are delivered to a MAC destination address (DA) and senders are recognized by a MAC source address (SA). Each switch, and each port on a switch, supports a finite number of MAC addresses. Ideally, the overall number of MAC addresses distributed by a switch should be large, so the switch can support a large number of devices.

In addition to supporting a large number of devices, a switch should comprise the ability to handle transfer of large amounts of data through a network. For a switch to handle quick transfer of large amounts of data, often link aggregation is utilized in order to allow a switch to support a higher bandwidth interface to increase the rate of data transfer.

Link aggregation is a technique that allows parallel physical links, also called pipes, between switches or between a switch and a server to be used simultaneously, multiplying the bandwidth between the devices. Link aggregation may be further defined as a method of grouping physical link segments of the same media type and speed, and treating them as if they were part of a single, logical link segment. For example, two 100 Mbps links between switches may be grouped into a link aggregation and treated as a single 200 Mbps link to create a higher bandwidth interface between the two switches.

In order to optimize data transmission across a link aggregation, a load balancing scheme is preferably implemented. Load balancing schemes attempt to distribute data in a balanced manner across the links of the link aggregation in order to optimize the available bandwidth. One load balancing technique may measure the bandwidth through each link and adjust data to move through under-utilized links to reduce traffic through over-utilized links. Other load balancing techniques may utilize less hardware through a table with a hashing scheme to distribute data for transmission across the link aggregation.

The load on a single link may become so heavy that the link becomes congested. When the link is congested, one or more flows, also called sessions, must be flushed from the link. Flushing involves stopping a flow, sending a stop message to the end point which was receiving the flow, receiving an acknowledgment, and resubmitting the flow for transmission utilizing a link. The flows that were flushed are then reassigned to links that are not as busy. The performance of a link aggregation is greatly reduced when flush operations occur.

Therefore a need exists for a data processing system and method for improving performance of a link aggregation system to minimize the number of flush operations.

SUMMARY OF THE INVENTION

A data processing system and method in a computer network are disclosed for improving performance of a link aggregation system included in the network. Parameters are established which are utilized to determine performance criteria of the link aggregation system. A performance of the link aggregation system is determined by determining the performance criteria. The performance of the link aggregation system changes in response to a flow traffic burden on the link aggregation system changing. The link aggregation system dynamically modifies the parameters in response to the changing performance of the link aggregation system. The link aggregation system is self-tuning and capable of automatically adjusting to a changing flow traffic burden on the link aggregation system.

The above as well as additional objectives, features, and advantages of the present invention will become apparent in the following detailed written description.

DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DESCRIPTION OF A PREFERRED EMBODIMENT

A preferred embodiment of the present invention and its advantages are better understood by referring to FIGS. 1–6 of the drawings, like numerals being used for like and corresponding parts of the accompanying drawings.

The present invention is a method and system for improving the performance of a link aggregation system by minimizing the number of flush operations that occur in the system. A plurality of self-tuning parameters are established. The parameters include a congestion parameter, flush parameter, flush quantity parameter, and traffic threshold parameter. These parameters are automatically and dynamically modified by the link aggregation system in response to the changing performance of the link aggregation system. In this manner, the link aggregation system is self-tuning and capable of automatically adjusting to the changing traffic burden on the system.

A level of congestion is determined utilizing the congestion parameter for each pipe included in the link aggregation system. The level of congestion is an indication of how much traffic the particular pipe is transmitting. The level of congestion includes a historical performance component plus an instantaneous performance component. The congestion parameter is utilized to determine the percentage of the total level of congestion attributable to each component.

A flush rate is also determined for each pipe included in the link aggregation system. The flush rate is determined utilizing a flush parameter. The flush rate is an indication of the number of flushes that have occurred in a particular pipe. The flush rate also includes a historical performance component plus an instantaneous performance component. The flush parameter is utilized to determine the percentage of the flush rate for a pipe attributable to each component.

A sampling period is established. The pipe traffic is measured for each pipe every sample period. A level of congestion and a flush operation rite are both determined at each sample period after each measurement for each pipe. A total system flush rate for the link aggregation system is also determined by adding together the flush operation rates for each pipe. The parameters are then automatically modified according to the total system flush rate value and the historical trend of the flush rate.

In this manner, the link aggregation system and the parameters utilized to determine the performance of the link aggregation system are automatically modified in response to the performance of the system. Therefore, the link aggregation system and the parameters are self-tuning which will be modified in response to the current performance and the historical performance of the system.

Figure 1:
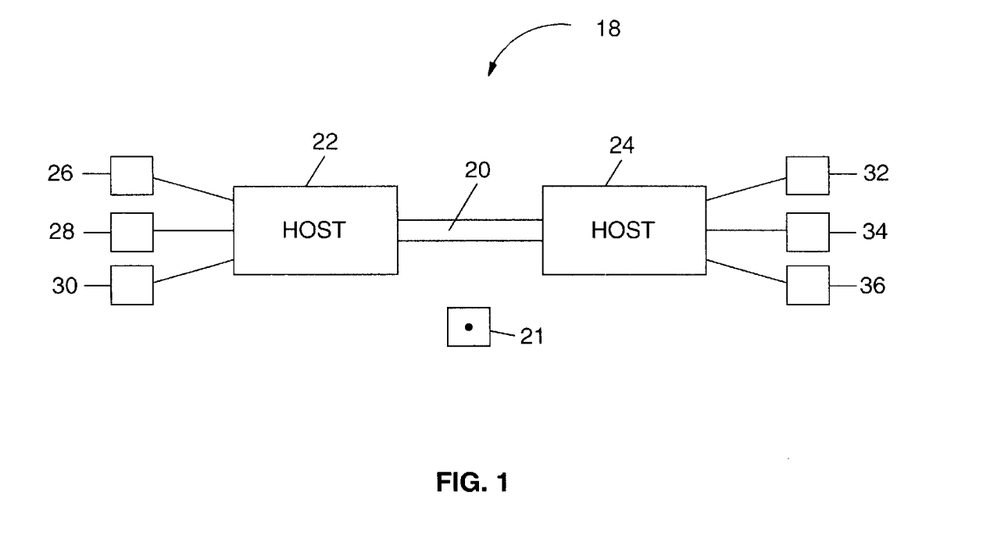
FIG. 1 is a high level block diagram of a link aggregation between two hosts for transmitting data between the hosts which may be utilized to implement the method and system of the present invention.

FIG. 1 is a high level block diagram of a link aggregation between two hosts for transmitting data between the hosts which may be utilized to implement the method and system of the present invention. A network 18 may be constructed utilizing a link aggregation 20 for transmitting data between host 22 and host 24. Software which directs the implementation of a flow transmission controller of the present invention may be provided to host 22 and/or host 24 for storage in host 22 and/or host 24 via a variety of signal-bearing media which include, but are not limited to writable storage media such as floppy disk 21. Hosts 22 and 24 preferably include a permanent storage medium (not shown) such as read-only memory (ROM) for storing the software and a temporary storage medium (not shown) such as random access memory (RAM) for supporting the implementation of the software as will be further described.

In a preferred embodiment of the present invention, a host 22 or 24 may be a switch, which may be an ethernet switch, or a host 22 or 24 may be a server. Each of the hosts 22 and 24 is networked with a plurality of devices, where host 22 is connected to devices 26, 28, and 30, and host 24 is connected to devices 32, 34, and 36. Those skilled in the art will appreciate that devices 26, 28, 30, 32, 34, and 36 may represent a plurality of devices which may be included in network, including additional hosts. The plurality of devices may be networked with other devices not shown in the present embodiment.

Figure 2:
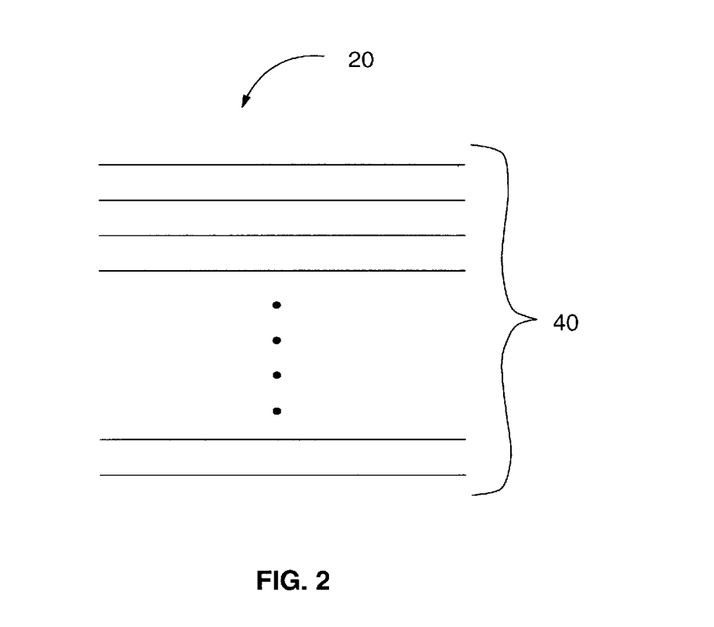
FIG. 2 is a more detailed diagram of a link aggregation which may be utilized to lip implement the method and system of the present invention.

FIG. 2 is a more detailed diagram of a link aggregation which may be utilized to implement the method and system of the present invention. Link aggregation 20 includes k links as illustrated at numeral 40. It is preferable that each of the k links illustrated at reference numeral 40 have similar bandwidth properties. However, it is not required. As previously described, it is desirable to be able to bundle a number of physical links together to form a link aggregation for optimizing bandwidth between switches. The k links illustrated at reference numeral 40 which are bundled into link aggregation 20 appear as a MAC interface to higher layer protocols and thereby may be utilized with a plurality of networking protocols.

The k links 40 are not restricted to contiguous physical numbering or starting with link number 1. For example, if k=4, the physical link numbers may be identified as links 1, 2, 3, and 4 where the link numbers are contiguous and start with link number 1. Or, the link numbers may be identified as links 3, 5, 6 and 12 where the link numbers are not contiguous. However, in both cases, there is a first link, a second link, a third link, and a fourth link in the k=4 aggregation 20 regardless of the actual link number. For purposes of illustration hereon, the links utilized are contiguous and start with a link number 1.

Figure 3:
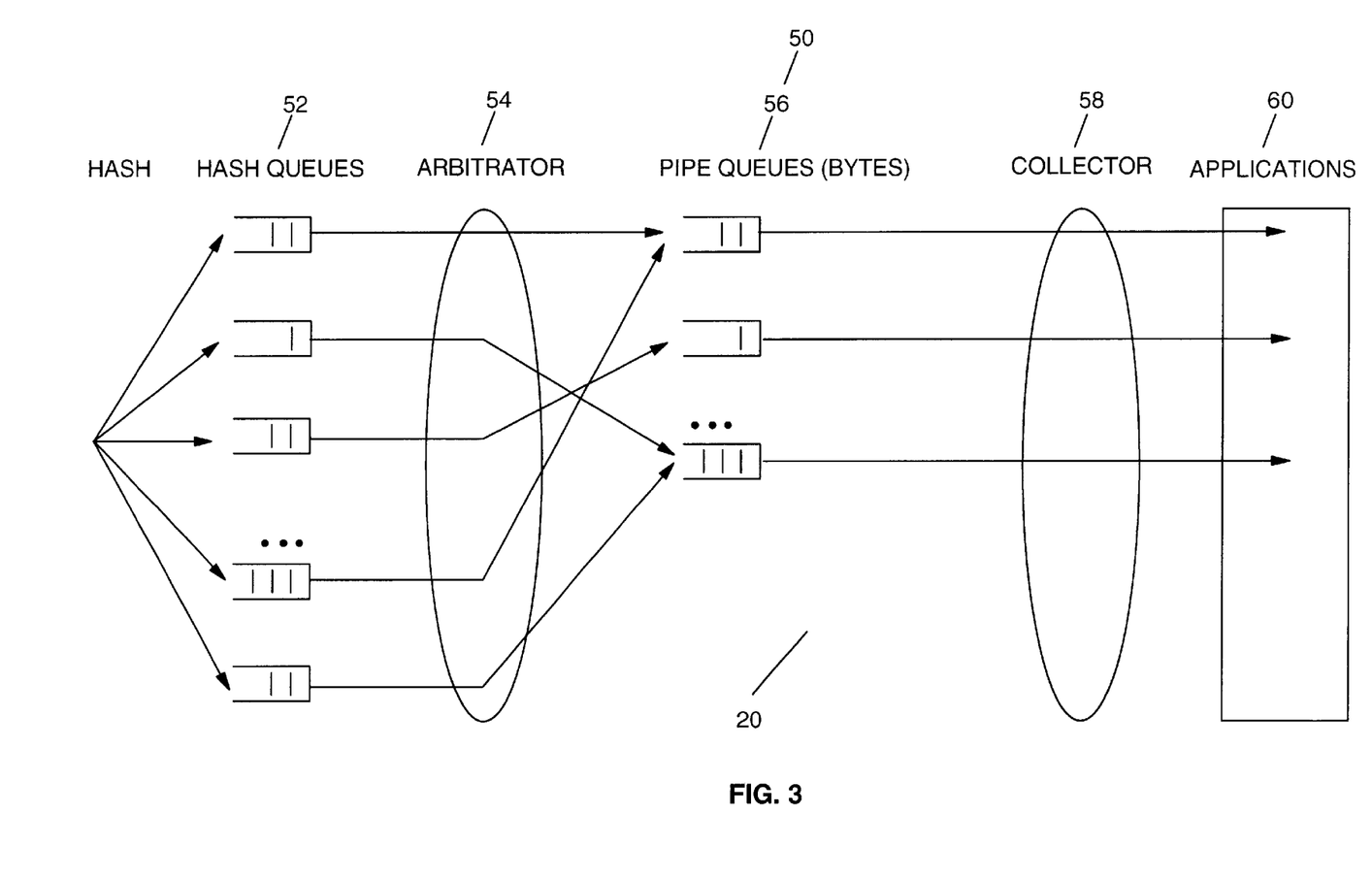
FIG. 3 depicts a high level block diagram of components of a link aggregation system in accordance with the method and system of the present invention.

FIG. 3 depicts a high level block diagram of components of a link aggregation system 50 in accordance with the method and system of the present invention. Link aggregation system 50 includes a plurality of hash queues 52, an arbitrator 54, a plurality of pipe queues 56, a collector 58, a plurality of applications 60, and link aggregation 20.

A flow, also called a session, is first hashed and then stored in its associated one of hash queues 52. Arbitrator 54 then analyzes pipe queues 56 to determine which pipe currently has the least amount of traffic. Arbitrator 54 then assigns the hashed flow to one of the pipe queues 56. This policy is a version of the Earliest Deadline First policy and is well known to those skilled in the art.

In accordance with the present invention, once associated to a pipe queue, no hash queue will be reassigned unless the pipe is congested.

At each sample period, "$\Delta t$", pipe queues 56 are sampled to determine the current level of traffic in the pipe, "$Q_i(t)$". Once the current traffic level $Q(t)$ is measured, the average pipe traffic, "$A_i$", is determined for each pipe (i) utilizing the formula:

$$A_i(t+\Delta t)=(1-\alpha)A_i(t)+\alpha Q_i(t),$$

with $0<\alpha \leq 1$. The parameter $\alpha$ is an averaging parameter. A small value for the averaging parameter means the average traffic level will be slow to change. The new value for the average traffic level for a small averaging parameter will reflect the history of the average traffic level, and will not include the current state of the pipe. A value of "1" for the averaging parameter means the average traffic level will reflect only the current state of the pipe and will not include any historical performance of the pipe. The parameter, α, is also referred to herein as a congestion parameter.

Congestion occurs in a pipe when the average pipe traffic exceeds a traffic threshold, "Q". When congestion occurs, flows from the pipe queue are flushed. If there is insufficient traffic in a pipe to exceed the traffic threshold parameter, no flush will occur even though the flows in different pipes are unequal. A flush quantity parameter, N, is a quantity of flows to flush from all of the hash queues that are assigned to the congested pipe. The N flows are reassigned using the above Earliest Deadline First policy.

A flush operation rate for each pipe is also determined. The flush operation rate is determined for each pipe (i) utilizing the formula:

$$F_i(t+\Delta t)=(1-\beta)F_i(t)+\beta C_i(t).$$

For pipe i at time t, the parameter $C_i(t)=1$ if a flush occurs. Otherwise, $C_i(t)=0$. A total flush rate is determined by adding together all of the flush rates for each pipe. parameters are self-tuning parameters. As time passes, the performance of the link aggregation system 50 is determined. Only when the total flush rate is positive will the parameters be modified. When the rate of change of the total flush rate, $F(t)-F(t-\Delta t)$, is increasing, the parameters are increased. When the rate of change of the total flush rate is decreasing, the parameters are decreased.

The changes in the parameters are by means of a round robin exponential decay to asymptotic values. Thus, the four parameters are subjected to modification, one at a time, for some fixed number of time steps.

A toggle variable, "v", is utilized in the modifications of the parameters. When the rate of change of the total flush rate is zero or positive, v is set equal to 1. When the rate of change of the total flush rate is negative, v is set equal to 0. Link aggregation system 50 utilizes the following formulas to modify the parameters:

Congestion parameter (α):

$$\alpha(t+\Delta t)=(1-K)\alpha(t)+Kv.$$

Flush parameter (β):

$$\beta(t+\Delta t)=(1-K)\beta(t)+Kv.$$

Traffic Threshold parameter (Q):

$$Q(t+\Delta t)=(1-K)Q(t)+KvQ_{max}.$$

Flush Quantity(N):

$$N(t+\Delta t)=(1-K)N(t)+KvN_{max}.$$

A constant, "K", is selected. Typically, K is set equal to either 0.01 or 0.1. The constant, K, is not typically modified once it is set.

When the congestion parameter a is set too small, system 50 is slow to respond to congestion because the level of congestion signal, $A_i$, is slow to respond. When the congestion parameter is set too high, system 50 provides an unstable reaction to congestion because the level of congestion signal instantaneously responds to congestion. When the traffic threshold parameter Q is set too small, the congestion signal is too sensitive resulting in over control of system 50. When the traffic threshold parameter Q is set too large, the congestion signal is too insensitive resulting in slow control of system 50. When the number of hash queues to flush parameter N is set too small, too few flushes occur, resulting in slow control. When the number of hash queues to flush parameter N is set too large, too many flushes occur, resulting in over control. When the flush parameter β is set too small, a failure to detect a trend in the flush rate occurs resulting in a slow response to congestion. When the flush parameter β is set too large, an overreaction to flushes occurs resulting in an unstable response to congestion.

Figure 4:
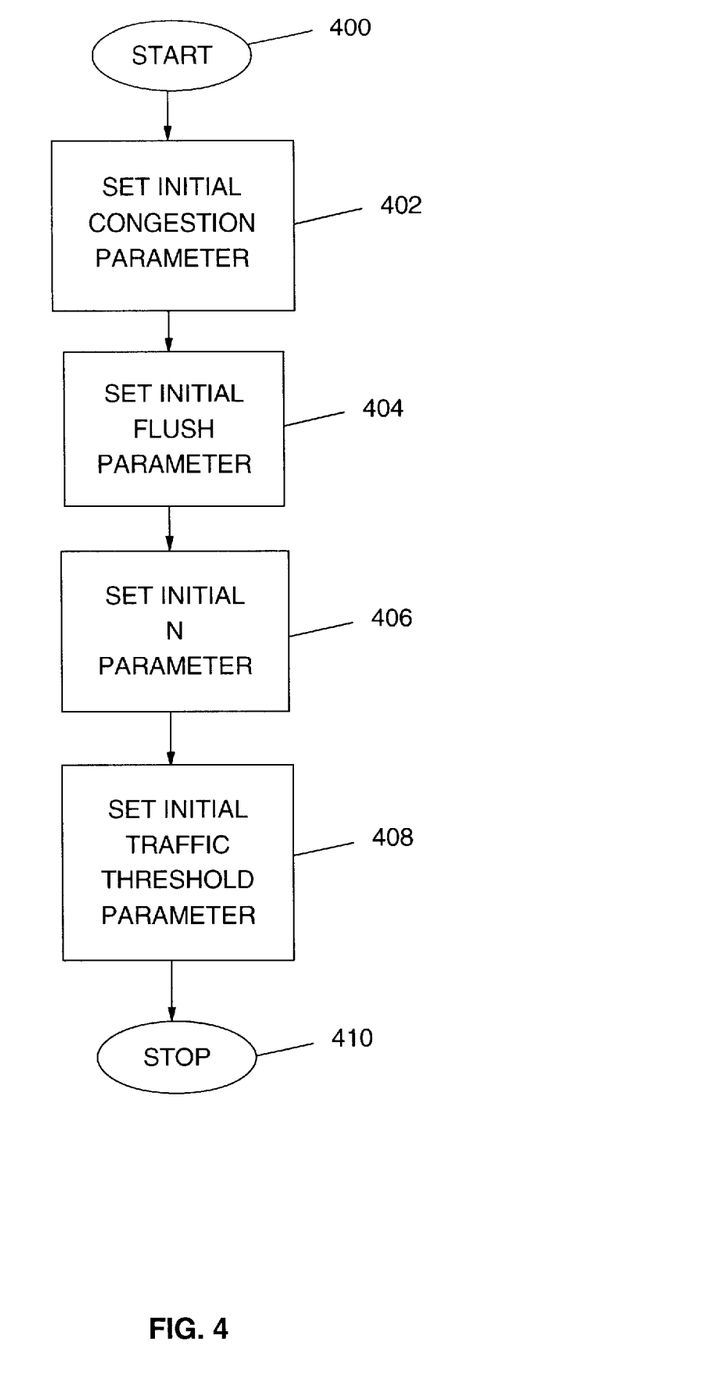
FIG. 4 illustrates a high level flow chart which depicts setting initial values for a plurality of self-tuning parameters in accordance with the method and system of the present invention.

FIG. 4 illustrates a high level flow chart which depicts setting initial values for a plurality of self-tuning parameters in accordance with the method and system of the present invention. The process starts as depicted at block 400 and thereafter passes to block 402 which illustrates setting an initial value for a congestion parameter "α". The congestion parameter is utilized to determine an average traffic flow in each pipe. Next, block 404 depicts setting an initial value for a flush parameter "β". The flush parameter is utilized to determine a flush rate for each pipe. Thereafter, block 406 illustrates setting an initial value for a parameter "N". The N parameter is a number of hash queues assigned to a pipe determined to be congested which will be flushed. Block 408, then, depicts setting an initial value for a traffic threshold parameter "Q". When the traffic threshold is exceeded, N flows in the pipe which exceeded the traffic threshold will be flushed. The process then terminates as illustrated at block 410.

Figure 5:
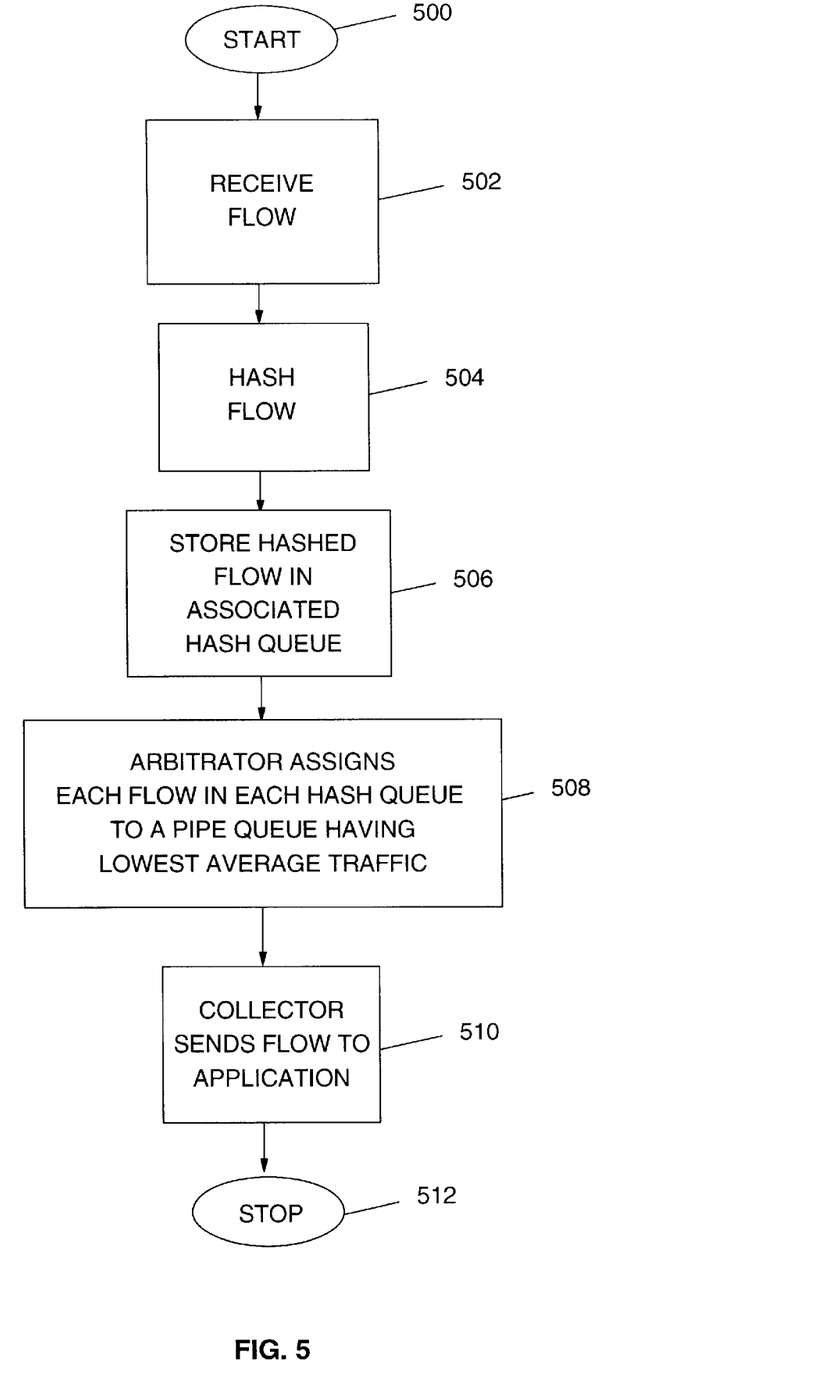
FIG. 5 depicts a high level flow chart which illustrates a flow being processed through a link aggregation system in accordance with the method and system of the present invention.

FIG. 5 depicts a high level flow chart which illustrates a flow being processed through a link aggregation system in accordance with the method and system of the present invention. The process starts as depicted at block 500 and thereafter passes to block 502 which illustrates receiving a flow. Next, block 504 depicts hashing the flow. The hashed flow is stored in its associated hash queue as illustrated at block 506. Thereafter, block 508 depicts the arbitrator assigning each flow in each hash queue to a pipe queue which has the lowest average traffic value. Block 510, then, illustrates the collector sending the flow to the application. The process then terminates as depicted at block 512.

Figure 6:
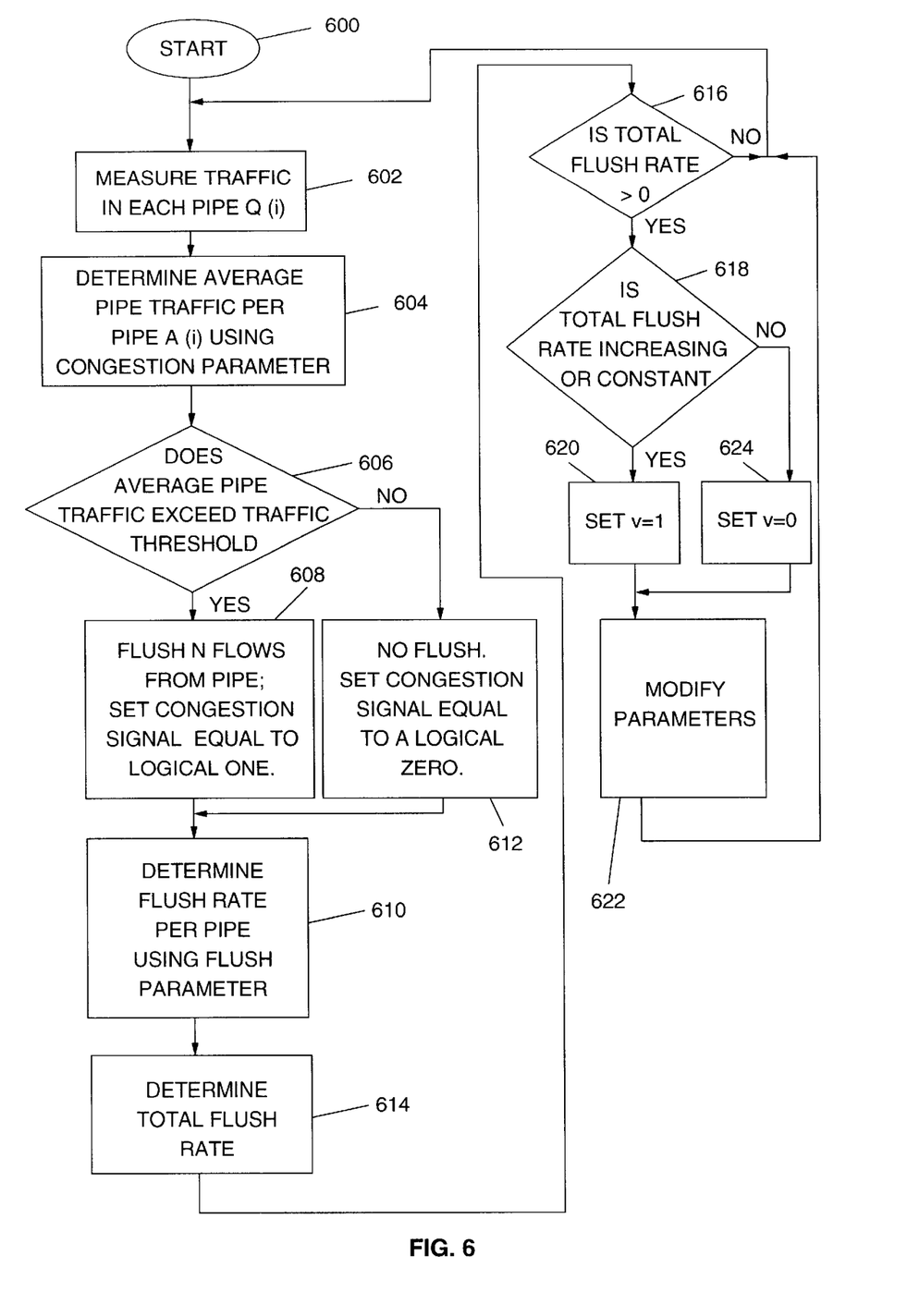
FIG. 6 illustrates a high level flow chart which depicts flushing flows from pipes in a link aggregation system in response to congestion determined utilizing self-tuning parameters in accordance with the method and system of the present invention.

FIG. 6 illustrates a high level flow chart which depicts flushing flows from pipes in a link aggregation system in response to congestion determined utilizing self-tuning parameters in accordance with the method and system of the present invention. The process starts as depicted block 600 and thereafter passes to block 602 which illustrates measuring the traffic, $Q_i$, in each pipe. Next, block 604 depicts determining the average pipe traffic for each pipe, $A_i$, using the congestion parameter "α". The average pipe traffic for a pipe "i" is determined utilizing the formula:

$$A_i(t+\Delta t)=(1-\alpha)A_i(t)+\alpha Q_i(t).$$

Thereafter, block 606 illustrates a determination of whether or not the average pipe traffic exceeds the traffic threshold, i.e. whether $A_i>Q$. If a determination is made that the average traffic does exceed the traffic threshold, the process passes to block 608 which depicts flushing N flows from the congested pipe. A congestion signal, $C_i$, is set equal to a logical one. The process then passes to block 610.

Referring again to block 606, if a determination is made that the average traffic does not exceed the traffic threshold, the process passes to block 612 which depicts no flush occurring. A congestion signal, $C_i$, is set equal to a logical zero. The process then passes to block 610.

Block 610 illustrates determining a flush rate, $F_i$, for each pipe using the flush parameter. The flush rate for a pipe "i" is determined utilizing the formula:

$$F_i(t+\Delta t)=(1-\beta)F_i(t)+\beta C_i(t).$$

Next, block 614 depicts determining a total flush rate, "F", by adding together the flush rates for each pipe. Thereafter, block 616 illustrates a determination of whether or not the total flush rate "F" is greater than zero. If a determination is made that the total flush rate is not greater than zero, the process passes back to block 602.

Referring again to block 616, if a determination is made that the total flush rate is greater than zero, the process passes to block 618 which depicts a determination of whether or not the total flush rate is increasing or constant. If a determination is made that the total flush rate is increasing or constant, the process passes to block 620 which illustrates setting a parameter "v" equal to one. The process then passes to block 622 which depicts modifying the parameters by increasing them according to the following equations with v=1.

Congestion parameter ($\alpha$):

$$\alpha(t+\Delta t)=(1-K)\alpha(t)+Kv.$$

Flush parameter ($\beta$):

$$\beta(t+\Delta t)=(1-K)\beta(t)+Kv.$$

Traffic Threshold parameter (Q):

$$Q(t+\Delta t)=(1-K)Q(t)+KvQ_{max}.$$

Flush Quantity(N):

$$N(t+\Delta t)=(1-K)N(t)+KvN_{max}.$$

A constant, "K", is selected. Typically, K is set equal to either 0.01 or 0.1. The constant, K, is not typically modified once it is set. The process then passes to block 602.

Referring again to block 618, if a determination is made that the total flush rate is decreasing, the process passes to block 624 which illustrates setting a parameter "v" equal to zero. The process then passes to block 622 which depicts modifying the parameters by decreasing them according to the equations above with v=0. The process then passes to block 602.

While a preferred embodiment has been particularly shown and described, it will be understood by those skilled in the art that various changes in form and detail may be made therein without departing from the spirit and scope of the present invention.

What is claimed is:

1. A method in a data processing system including a network for improving performance of a link aggregation system included in said network, said link aggregation system comprising multiple parallel pipes, said method comprising the steps of:
    establishing a traffic threshold parameter, a congestion parameter, and a flush parameter to determine a performance of a pipe in said link aggregation system,
        said traffic threshold parameter being a maximum data transmission capacity of said pipe,
        said congestion parameter being a percentage, attributable to said pipe, of a total amount of data traffic in said link aggregation system, and
        said flush parameter being a percentage, attributable to said pipe, of a total number of flushes in said link aggregation system, said flushes occurring in each said pipe when an amount of data traffic exceeds said traffic threshold parameter;
    determining a performance of said pipe by determining said congestion parameter and said flush parameter for said pipe in response to a flow traffic burden on said link aggregation system changing; and
    dynamically modifying said congestion parameter and said flush parameter for said pipe in response to a changing performance of said pipe caused by a changing flow traffic burden on said pipe, wherein said link aggregation system is self-tuning and capable of automatically adjusting to said changing flow traffic burden on said link aggregation system.

2. The method according to claim 1, wherein said congestion parameter and said flush parameter each include a historical performance component and an instantaneous performance component.

3. The method according to claim 1, wherein each said pipe in said link aggregation system is logically in parallel to another said pipe.

4. The method according to claim 1, further comprising the step of flushing at least one flow from said pipe in response to a level of data transmission attempted via said pipe exceeding said traffic threshold parameter.

5. The method according to claim 1, wherein said congestion parameter and said flush parameter are set during a subsequent said sampling periods.

6. The method according to claim 5, further comprising:
    determining said flush parameter during a subsequent said sampling period; and
    determining a rate of change of said flush parameters.

7. The method according to claim 6, further comprising increasing said congestion and flush parameters in response to said rate of change being positive.

8. The method according to claim 6, further comprising decreasing said congestion and flush parameters in response to said rate of change being negative.

9. A data processing system including a network for improving performance of a link aggregation system included in said network, said link aggregation system comprising multiple parallel pipes, said link aggregation system comprising:
    means for establishing a traffic threshold parameter, a congestion parameter, and a flush parameter to determine a performance of a pipe in said link aggregation system,
        said traffic threshold parameter being a maximum data transmission capacity of said pipe,
        said congestion parameter being a percentage, attributable to said pipe, of a total amount of data traffic in said link aggregation system, and
        said flush parameter being a percentage, attributable to said pipe, of a total number of flushes in said link aggregation system, said flushes occurring in each said pipe when an amount of data traffic exceeds said traffic threshold parameter;
    means for determining a performance of said pipe by determining said congestion parameter and said flush parameter for said pipe in response to a flow traffic burden on said link aggregation system changing; and
    means for dynamically modifying said congestion parameter and said flush parameter for said pipe in response to a changing performance of said pipe caused by a changing flow traffic burden on said pipe, wherein said link aggregation system is self-tuning and capable of automatically adjusting to said changing flow traffic burden on said link aggregation system.

10. The system according to claim 9, further comprising:
    means for said congestion parameter and said flush parameter each include a historical performance component and an instantaneous performance component.

11. The system according to claim 9, wherein each said pipe in said link aggregation system is logically in parallel to another said pipe.

12. The system according to claim 9, further comprising means for flushing at least one flow from said pipe in response to a level of data transmission attempted via said pipe exceeding said traffic threshold parameter.

13. The system according to claim 9, wherein said congestion parameter and said flush parameter are set during a plurality of pare-determined sampling periods.

14. The system according to claim 13, further comprising:

means for determining said flush parameter during a subsequent said sampling period; and means for determining a rate of change of said flush parameters.

15. The system according to claim 14, further comprising means for increasing said congestion and flush parameters in response to said rate of change being positive.

16. The system according to claim 14, further comprising means for decreasing said congestion and flush parameters in response to said rate of change being negative.

* * * * *